(12) United States Patent
Akiyama

(10) Patent No.: US 9,073,553 B2
(45) Date of Patent: Jul. 7, 2015

(54) METHOD FOR PROVIDING CONTROL SYSTEM OF VEHICLE

(75) Inventor: Susumu Akiyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1292 days.

(21) Appl. No.: 11/283,578

(22) Filed: Nov. 18, 2005

(65) Prior Publication Data

US 2006/0111826 A1 May 25, 2006

(30) Foreign Application Priority Data

Nov. 19, 2004 (JP) .................................. 2004-336548

(51) Int. Cl.
| | |
|---|---|
| *B60W 50/00* | (2006.01) |
| *B60Q 1/12* | (2006.01) |
| *B60Q 1/14* | (2006.01) |
| *B60W 10/06* | (2006.01) |
| *B60W 10/30* | (2006.01) |
| *B60W 30/16* | (2012.01) |
| *B60R 21/015* | (2006.01) |
| *B60R 21/013* | (2006.01) |
| *B60R 21/01* | (2006.01) |

(52) U.S. Cl.
CPC .................. *B60W 50/00* (2013.01); *B60Q 1/12* (2013.01); *B60Q 1/1423* (2013.01); *B60Q 2300/322* (2013.01); *B60Q 2300/42* (2013.01); *B60R 21/013* (2013.01); *B60R 2021/01047* (2013.01); *B60W 10/06* (2013.01); *B60W 10/30* (2013.01); *B60W 30/16* (2013.01); *B60W 50/0098* (2013.01); *B60W 2550/12* (2013.01); *B60W 2720/10* (2013.01); *B60W 2750/308* (2013.01); *B60R 21/01512* (2014.10); *B60R 21/01544* (2014.10)

(58) Field of Classification Search
CPC ..... B60W 50/00; B60W 10/06; B60W 10/30; B60W 30/16; B60Q 1/12; B60Q 1/1423; B60R 21/1512

See application file for complete search history.

(56) References Cited

U.S. PATENT DOCUMENTS 5,019,759 A * 5/1991 Takemura et al. ............. 318/466
5,081,583 A * 1/1992 Kono et al. ..................... 701/53

(Continued)

FOREIGN PATENT DOCUMENTS

| JP | 63-88930 | 4/1988 |
|---|---|---|
| JP | 02-290745 | 11/1990 |

(Continued)

OTHER PUBLICATIONS

Notification of Reasons for Rejection dated Feb. 1, 2010 by the Japanese Patent Office for counterpart Japanese application No. JP 2004-336548.

(Continued)

*Primary Examiner* — Nicholas Kiswanto

(74) *Attorney, Agent, or Firm* — Harness, Dickey & Pierce, P.L.C.

(57) ABSTRACT

A method of preparing a vehicle control system having an intended function by using at least two ECUs is provided. One of the at least two ECUs is used for adaptively incorporating a modified portion of the intended function of the vehicle control system through re-design in a short period, while the rest of the ECUs in the vehicle control system sustain and support an unchanging portion of the intended function of the vehicle control system.

37 Claims, 4 Drawing Sheets

(56) References Cited

U.S. PATENT DOCUMENTS

| | | | |
|---|---|---|---|
| 5,142,474 A * | 8/1992 | Miyata et al. | 701/29.2 |
| 5,572,484 A * | 11/1996 | Gaus et al. | 367/99 |
| 5,826,951 A * | 10/1998 | Sano | 303/146 |
| 6,104,971 A * | 8/2000 | Fackler | 701/36 |
| 6,181,563 B1 | 1/2001 | Shimbo et al. | |
| 6,202,012 B1 * | 3/2001 | Gile et al. | 701/48 |
| 6,321,150 B1 * | 11/2001 | Nitta | 701/32.7 |
| 6,360,152 B1 * | 3/2002 | Ishibashi et al. | 701/48 |
| 6,643,577 B1 * | 11/2003 | Padgett et al. | 701/50 |
| 6,860,351 B2 * | 3/2005 | Landes et al. | 180/170 |
| 6,982,648 B2 | 1/2006 | Cros et al. | |
| 7,008,069 B2 * | 3/2006 | Ostreko et al. | 359/876 |
| 7,222,006 B2 * | 5/2007 | Proefke et al. | 701/29.6 |
| 7,319,923 B2 * | 1/2008 | Hoenninger et al. | 701/1 |
| 7,366,600 B2 * | 4/2008 | Osaki et al. | 701/50 |
| 7,483,778 B2 * | 1/2009 | Armbruster et al. | 701/48 |
| 2001/0032042 A1 * | 10/2001 | Disser et al. | 701/48 |
| 2002/0045952 A1 | 4/2002 | Blemel | 700/2 |
| 2002/0185358 A1 * | 12/2002 | Zeitler et al. | 198/370.02 |
| 2003/0038719 A1 * | 2/2003 | Mattes et al. | 340/541 |
| 2004/0010322 A1 * | 1/2004 | Tanaka | 700/2 |
| 2004/0024502 A1 * | 2/2004 | Squires et al. | 701/33 |
| 2004/0044448 A1 * | 3/2004 | Ramaswamy et al. | 701/22 |
| 2004/0083043 A1 | 4/2004 | Akiyama et al. | |
| 2004/0149504 A1 * | 8/2004 | Swoboda et al. | 180/169 |
| 2005/0085953 A1 * | 4/2005 | Hoenninger et al. | 701/1 |
| 2005/0232437 A1 | 10/2005 | Albus et al. | |
| 2005/0234603 A1 * | 10/2005 | Bale et al. | 701/2 |
| 2005/0270621 A1 * | 12/2005 | Bauer et al. | 359/265 |
| 2006/0155469 A1 * | 7/2006 | Kawasaki | 701/301 |
| 2007/0291383 A1 * | 12/2007 | Watson et al. | 359/872 |

FOREIGN PATENT DOCUMENTS

| | | |
|---|---|---|
| JP | 6-22189 | 1/1994 |
| JP | 7-131464 | 5/1995 |
| JP | 08-180934 | 7/1996 |
| JP | 10-170311 | 6/1998 |
| JP | 11-042957 | 2/1999 |
| JP | 11-91464 | 4/1999 |
| JP | 11-232241 | 8/1999 |
| JP | 2001-145233 | 5/2001 |
| JP | 2002-314558 | 10/2002 |
| JP | 2003-132407 | 5/2003 |
| JP | 2003-191788 | 7/2003 |
| JP | 2004-066974 | 3/2004 |
| JP | 2004-109057 | 4/2004 |
| JP | 2004-523953 | 8/2004 |
| JP | 2004-245199 | 9/2004 |
| JP | 2004-289306 | 10/2004 |

OTHER PUBLICATIONS

Notification of Reasons for Rejection dated Sep. 1, 2009 by the Japanese Patent Office for counterpart Japanese application No. JP 2004-336548.

Office action dated Oct. 26, 2010 in corresponding Japanese Application No. 204-336548.

Office action dated Nov. 1, 2011 in corresponding Japanese Application No. 2004-336548.

Office Action issued Dec. 11, 2012 in corresponding Japanese Application No. 2011-109051, a divisional of Application No. 2004-336548, with English translation.

Office Action dated Apr. 2, 2013 in corresponding Japanese Application No. 2011-109051, a division of Application No. 2004-336548, with English translation.

Office Action mailed Jan. 14, 2014 in corresponding JP application No. 2013-112717, which is the divisional application of JP 2004-336548, and English translation.

Office action mailed May 20, 2014 in corresponding Japanese Application No. 2013-112717.

* cited by examiner

METHOD FOR PROVIDING CONTROL SYSTEM OF VEHICLE

CROSS REFERENCE TO RELATED APPLICATION

This application is based on and claims the benefit of priority of Japanese Patent Application No. 2004-336548 filed on Nov. 19, 2004, the disclosure of which is incorporated herein by reference.

FIELD OF THE INVENTION

The present invention generally relates to a control system being used for controlling various systems in a vehicle.

BACKGROUND OF THE INVENTION

In recent years, various types of electrical controls are used in a vehicle for achieving improvement in fuel consumption, safety, convenience or the like. That is, areas of functionality of electric control units (ECUs) are broadened and the number of the features in the ECU is increasing.

Further, the ECUs in the vehicle are interconnected with each other through a wired/wireless network for the exchange of control data and interactive operation. This kind of network is a so-called vehicle LAN.

Each of those ECUs is used for controlling a specific mechanism in the vehicle, and thus is named after its function. That is, the types of ECUs includes an engine ECU for controlling an engine, a cruise control ECU for controlling vehicle speed and an inter-vehicle distance, a transmission ECU for controlling an automatic transmission and the like. The scheme of the use of the ECUs for the vehicle are disclosed in Japanese Patent Document No. JP-A-2004-136816.

However, the ECU dedicated for a specific purpose is inflexible in terms of a change/modification in the ECU, because of a rigid combination of circuits used therein and/or other restrictions. That is, a partial change of the ECU function leads to an entire re-designing of the specification, or a delay in the development schedule. The re-designing and re-scheduling of ECU development cause an increased cost of production.

For example, the ECU used for a cruise control system has two main functions, that is, a function for maintaining a constant speed of a subject vehicle and a function for maintaining a constant inter-vehicle distance toward a preceding vehicle. In this case, the speed maintaining function in the cruise control ECU is fully developed that the implementation of the speed maintaining function in the ECU does not have to be changed in the future, while the inter-vehicle distance maintaining function may incorporate changes in terms of, for example, an improved algorithms for distance detection and a modification of the sensors used for distance detection. This kind of changes in the specification of an ECU and/or the sensing/actuating device connected thereto lead to a change of the design of the entire ECU.

SUMMARY OF THE INVENTION

In view of the above-described and other problems, the present invention provides a method for composing a control system as ECUs (electric control units) for facilitating the development of the control system of an automotive vehicle.

The methodology of structuring/composing/implementing the control system of the vehicle in the present invention first abstractively divides an intended functionality of the vehicle into two parts, that is, a primary/standard part that is expected to have few changes in a period in terms of development period of the control system and an additional part that is expected to have quite a few changes during the development period, and then provides different implementation bodies for each of the two parts of the intended functionality of the control system. In other words, the intended functionality of the control system in at least two separate bodies is jointly developed and yet separately implemented by a combination of a standard ECU and an additional ECU according to an optimally arbitrated division of the functionality. The methodology described above enables the development of the control system (e.g., an ECU) to be free of entire design change caused by a minor change and/or modification of the intended functionality in the course of development, and thereby decreases the total development cost of the control system including the design cost, the development period and the like. Further, the additional portion of the functionality can be selectively added, changed or omitted by simply adding, changing or omitting the additional ECU.

Furthermore, the additional portion of the functionality that is generally an expensive portion of the ECU can be customized readily and flexibly based on a specific demand of a customer of the control system as a value-added portion of the control system.

According to one aspect of the present invention, the additional portion of the control system may be integrally included in a sensor or an actuator that is used by the additional part of the functionality of the control system. In this manner, the control system can be constructed in a body having compactness.

According to yet another aspect of the present invention, a primary control system (ECU) takes charge of a cruise control for enabling a traveling of the subject vehicle in a constant speed, and a secondary control system (ECU) takes charge of an inter-vehicle distance control for enabling a traveling of the subject vehicle in a constant distance toward a preceding vehicle in a vehicle control system. The primary and the secondary control systems (ECUs) have respective bodies as the ECU in the vehicle control system intended for an integrated cruise control.

The vehicle control system composed in the above-described manner can handle and adapt to a specification change in the inter-vehicle distance control function only by changing the design of the secondary control system (ECU). Further, the inter-vehicle distance control function can easily be made separable in the vehicle control system. Furthermore, the secondary control system (ECU) may be integrated into a radar, e.g., a millimetric-wave radar, to have compactness and readiness for disposition on a circuit board.

The vehicle control system having a different control function can also be composed in the above-described manner for the ease of development management. For example, when device control functions for handling an input from switch operated by a user as well as for handling an input from a detection device for detecting a certain event are respectively borne by the primary control system and the secondary control system, a specification change in the function for handling the input from the detection device can be accommodated only by changing the design of the secondary control system (ECU). The function in the secondary control system (ECU) may easily be made optional.

The vehicle control system having the primary and secondary control systems (ECU) respectively for portions of an intended functionality included therein can be applied to various devices and systems. For example, a wiper control system for controlling operation of a wiper can accommodate a functional change only with replacement or re-designing of the secondary control system (ECU) when the changed function is implemented as the secondary control system (ECU). Another example is a headlight control system for controlling an angle of the headlight in a vertical or horizontal direction based on the input from a switch as well as the input from an on-coming vehicle detector or a road curvature detector. Changes in specification of detector control can be accommodated only by the secondary control system (ECU) when the detector control is implemented only in the secondary control system (ECU).

Other examples can be described as a vehicle control system for controlling a climate control apparatus, an audio-visual system or the like. When the primary control system (ECU) bears the standardized portion of the intended function and the secondary control system (ECU) bears the additional portion or added-value portion of the intended function, the added-values can readily be changed, replaced or omitted only by changing, replacing or omitting the secondary control system (ECU).

The examples of this scheme for accommodating the change in specification of the ECU function are also found in a seat-belt control system in cooperation with an expected collision detection system, an engine control system in cooperation with a valve-timing control system, and an instrument panel information control system in cooperation with a head-up display control system.

A communication apparatus that uses a long range radio-frequency transmission in cooperation with a short range wireless transmission system may be yet another example of the above-described scheme of ECU structure. That is, the short range wireless transmission system is borne by the secondary control system (ECU) for the ease of specification change adaptation as the vehicle control system.

Throughout the vehicle control systems, devices and apparatus described above, the secondary control system that accommodates the value-added and therefore modification-prone portion of the intended functionality may be integrally placed in a sensing device or an actuating device for compactness and readiness for disposition of the control system in the vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Details of embodiments of a vehicle control system in the present invention are described with reference to the drawings.

Figure 1:
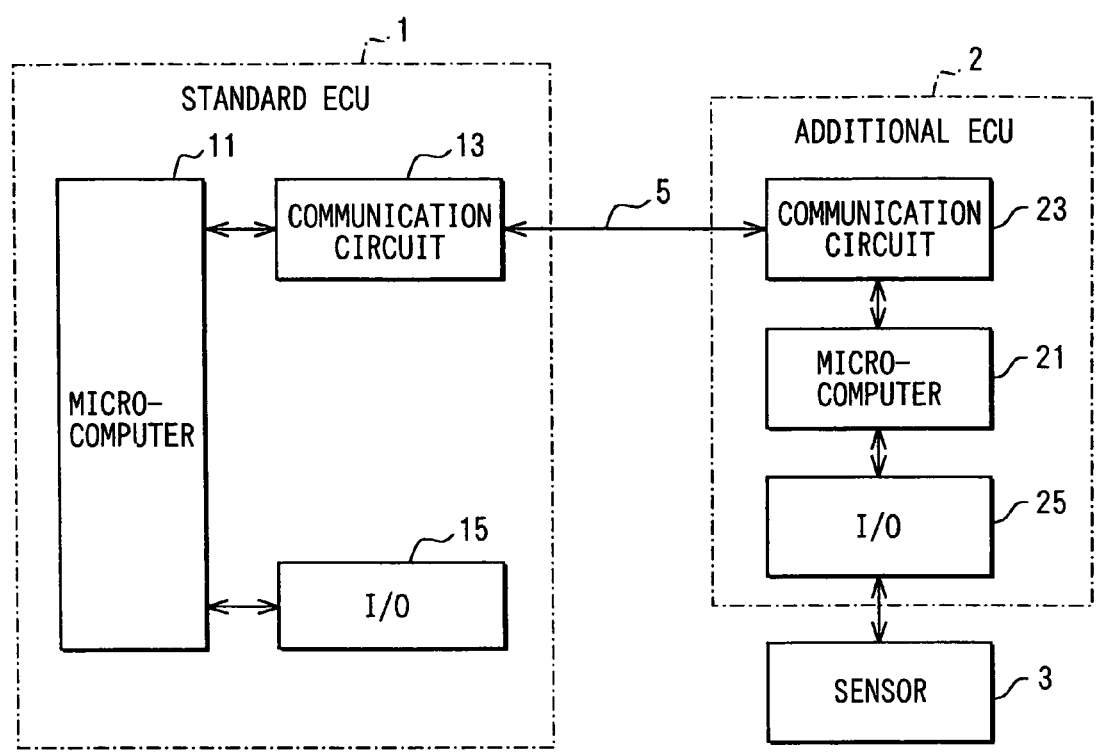
FIG. 1 shows a block diagram of a vehicle control system in an embodiment of the present invention.

FIG. 1 shows a basic structure of the vehicle control system that is common to the embodiments described hereinafter. Required functions of the vehicle control system are separately borne by two parts, that is, a standard function ECU 1 for controlling standard and thus not-frequently changing function in the vehicle, and an additional function ECU 2 for controlling an additional and thus relatively frequently changing function in the vehicle. The standard function ECU 1 and the additional function ECU 2 are connected each other through a wiring 5.

The standard function ECU 1 includes a microcomputer 11 for controlling the function of the ECU 1, a communication circuit 13 for controlling communication through the wiring 5 to and from the ECU 2 and other devices, an I/O (input and output) circuit 15 for controlling an input of sensor/switch signals for the microcomputer 11 and an output of instruction signals to an actuator or the like.

The additional function ECU 2 includes a microcomputer 21 for controlling the function of the ECU 2, a communication circuit 23 for controlling communication through the wiring 5 to and from the ECU 1 and other devices, an I/O circuit 25 for controlling an input of sensor/switch signals for the microcomputer 21 and an output of instruction signals to an actuator or the like. The I/O circuit 25 is connected to a sensor 3 that is used by the ECU 2 for operating the additional function of the ECU 2.

FIG. 1 shows that only the sensor 3 is connected to the I/O circuit 25. However, the I/O circuit 25 may be connected to the actuator (not shown in the figure) for actuating a required device for the additional function. The I/O circuit 25 may be connected both of the sensor and the actuator.

Figure 2A:
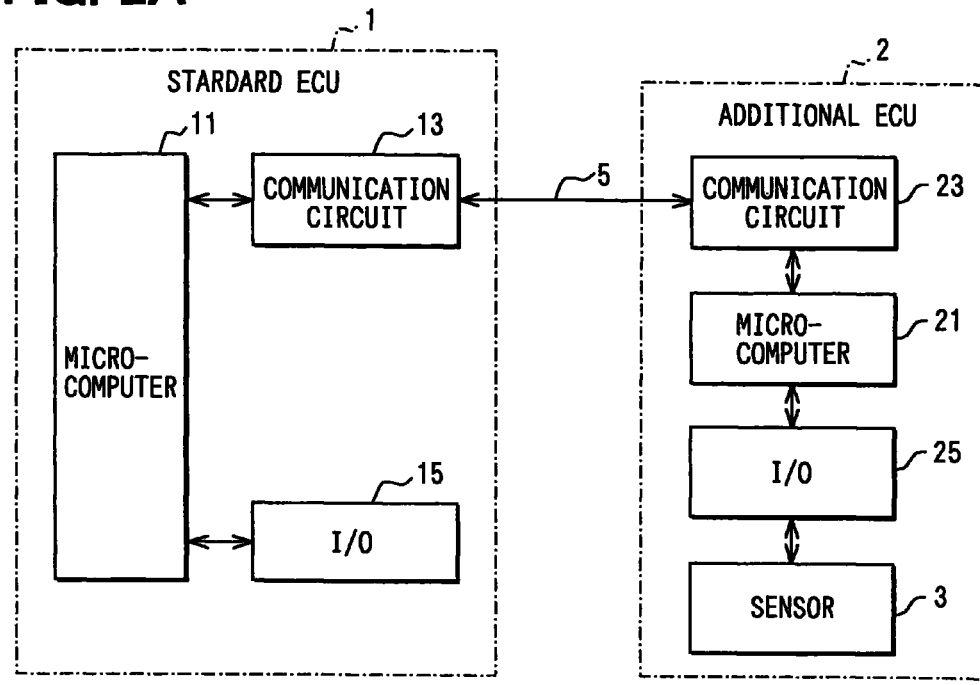
FIG. 2A shows a block diagram of a vehicle control system in another embodiment of the present invention.

The sensor and/or the actuator may be disposed in the ECU 2 as shown in FIG. 2A. That is, the ECU 2 may be integrally structured with the sensor 3 and/or the actuator according to the additional function for compactness.

Figure 2B:
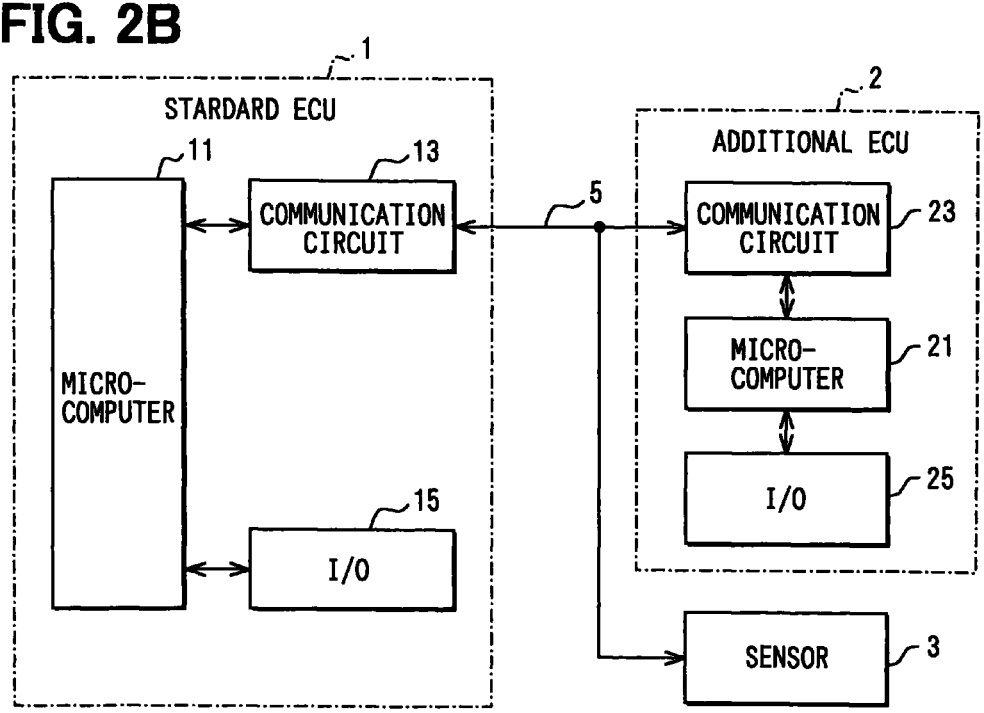
FIG. 2B shows a block diagram of a vehicle control system in yet another embodiment of the present invention.

The signal from the sensor 3 may be input through the wiring 5 and the communication circuit 23 instead of the I/O circuit 25 as shown in FIG. 2B.

(First Embodiment)

A first embodiment of the vehicle control system of the present invention includes a standard function ECU 1 for controlling a standard function, that is, in this case, maintaining a constant traveling speed of a subject vehicle, and an additional function ECU 2 for controlling an additional function, that is, in this case, maintaining a constant distance between a preceding vehicle and the subject vehicle based on a detected inter-vehicle distance. The sensor 3 in the ECU 2 is used for detecting the preceding vehicle and the distance thereto, and the sensor 3 is, for example, a millimetric-wave radar, a camera or the like.

Figure 3A:
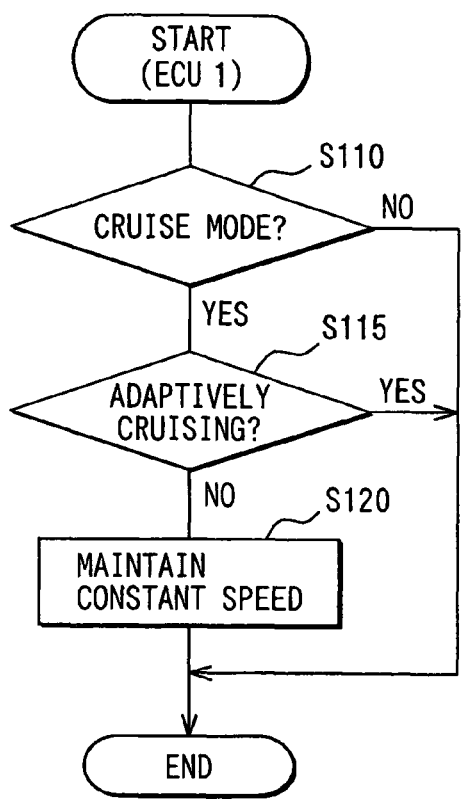
FIG. 3A shows a flowchart of a process executed in a microcomputer in an ECU in a first embodiment.
Figure 3B:
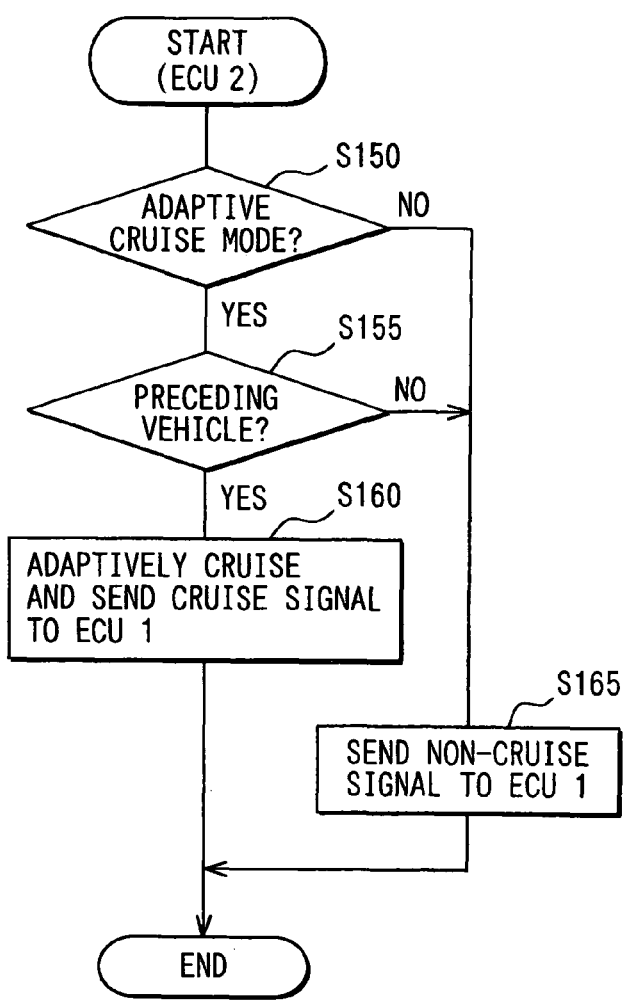
FIG. 3B shows a flowchart of a process executed in a microcomputer in another ECU in the first embodiment.

Next, the processes executed in the microcomputers 11, 21 are described with reference to flowcharts in FIGS. 3A and 3B. The flowchart in FIG. 3A is, for example, a process that is executed by the microcomputer 11 at a predetermined interval, and the flowchart in FIG. 3B is, for example, a process that is executed by the microcomputer 21 at a predetermined interval.

In step S110, the process determines whether a cruise control mode is set to the vehicle control system for traveling at a constant speed. The cruise control mode is set to the vehicle control system by a driver's operation of a switch (not shown in the figure).

The process of the flowchart proceeds to step S115 when the vehicle control system is in the cruise control mode (step S110: YES). The process proceeds to be concluded when the cruise control mode is not set (step S110: NO).

In step S15, the process determines whether the vehicle control system is in an adaptive cruise control mode for adaptively following the preceding vehicle based on a control signal from the additional function ECU 2. Details of the control signal from the additional function ECU 2 are described later. The process proceeds to step S120 when the adaptive cruise control mode is not set (step S115: NO). The process proceeds to be concluded when the adaptive cruise control mode is set (step S115: YES).

In step S120, the process executes constant speed control for the subject vehicle before it concludes the process itself. The constant speed control in step S120 is executed in a manner that the speed of the subject vehicle is adjustably controlled to a predetermined constant speed of the driver's choice by controlling an output of an engine or the like. The output of the engine is controlled by sending a control signal to a throttle ECU for controlling an opening of a throttle.

Next, the process in the additional function ECU 21 is described with reference to the flowchart in FIG. 3B.

In step S150, the process determines whether the adaptive cruise control is set. The adaptive cruise control mode is set by driver's operation of switches for both of the cruise control mode and adaptive cruise control mode (not shown in the figure). The process proceeds to step S155 when the adaptive cruise control mode is set (step S150: YES). The process proceeds to step S165 when the adaptive cruise control mode is not set (step S150: NO).

In step S155, the process determines whether there is a preceding vehicle based on a signal from the sensor 3. The process proceeds to step S160 when there is the preceding vehicle (step S155: YES). In this case, the process informs the ECU 1 of the operation of the adaptive cruise control in step S160. The adaptive cruise control in step S160 is conducted in a manner that the speed of the subject vehicle and an inter-vehicle distance between the preceding vehicle and the subject vehicle are adjustably controlled to a predetermined constant value of the driver's choice by controlling the output of the engine and/or the brake. The output of the engine is controlled by sending a control signal to a throttle ECU for controlling an opening of a throttle. The brake is controlled by sending a control signal to another ECU for controlling an application of the brake. The process proceeds to step S165 when there is no preceding vehicle (step S155: NO).

In step S165, the process informs the ECU 1 of non-operation of the adaptive cruise control. The process of the flow-chart in FIG. 3B concludes after step S165.

The ECU 2 stops the operation of the adaptive cruise control and informs the ECU 1. of non-operation state of the adaptive cruise control during the operation of the adaptive cruise control, when the preceding vehicle is lost, for example, because of an acceleration of the preceding vehicle (step S155). The ECU 1 resumes the operation of the cruise control (step S115: NO->step S120). The adaptive cruise control is resumed when the subject vehicle catches up the preceding vehicle (step S155: YES->step S160).

The vehicle control system in the first embodiment can be adaptively modified to a change in specification of the adaptive cruise control (e.g., change of the sensor 3, or preceding vehicle detection logic or the like) without changing the ECU 1. That is, the ECU 2 solely accommodates the change in the specification, and thus the development period of the vehicle control system can be decreased for the improved productivity and cost performance compared to a case that the design of the intended functionality is implemented as a single ECU.

Further, the adaptive cruise control function can be easily omitted when it is specified as an optional function in the vehicle control system. That is, the cruise control function without the adaptive cruise control sub-function can be prepared only by omitting the additional function ECU 2. In this manner, the cruise control function having the optional function can be readily implemented by using the ECUs.

(Second Embodiment)

In a second embodiment of the present invention, the standard function ECU 1 is used for controlling the operation of a wiping system based on an input from a switch by a user, and the additional function ECU 2 is used for detecting the amount of rain and controlling wiping frequency. In this scheme of ECU structure, the sensor 3 is a rain sensor for detecting the rain on the windshield or the like. The sensor 3 includes a light emission element such as an LED for emitting a light and a light reception element such as a photo transistor for receiving a reflection of the light on the windshield or the like. The amount of the received light is converted to a signal for representing the amount of the rain on the windshield or the like.

Figure 4A:
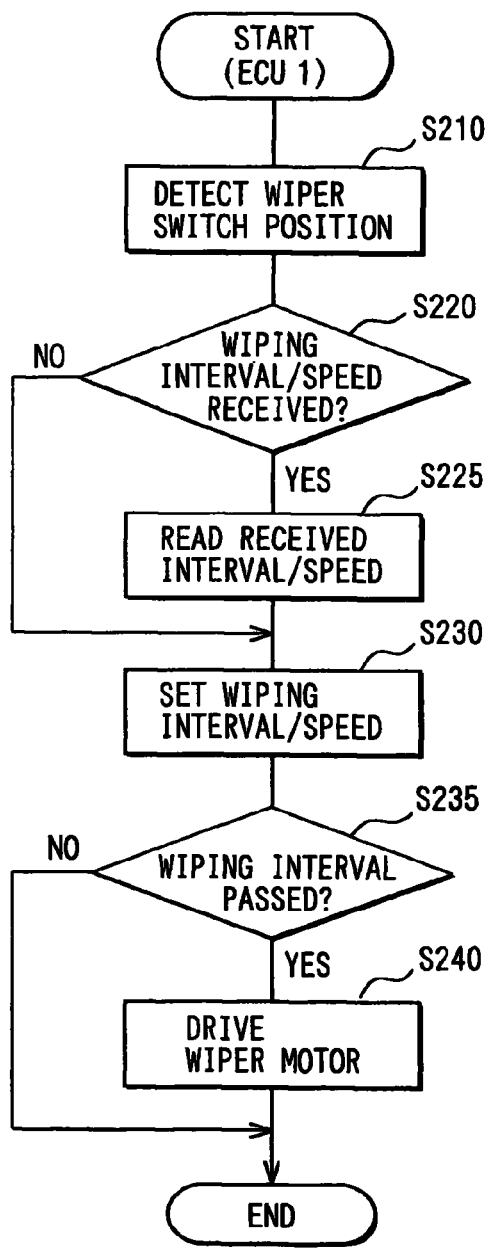
FIG. 4A shows a flowchart of a process executed in a microcomputer in an ECU in a second embodiment.
Figure 4B:
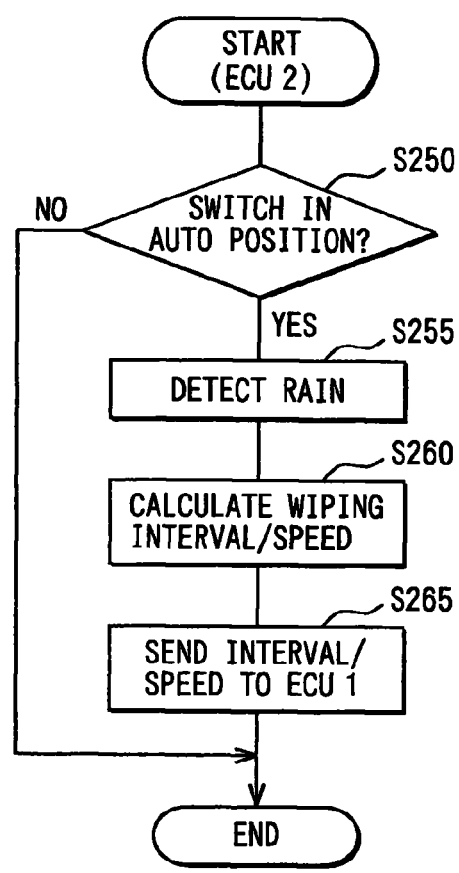
FIG. 4B shows a flowchart of a process executed in a microcomputer in an ECU in the second embodiment

The processes executed in the ECU 1 and ECU 2 are described with reference to flowcharts in FIGS. 4A and 4B. The flowchart in FIG. 4A is, for example, a process that is executed by the microcomputer 11 at a predetermined interval, and the flowchart in FIG. 4B is, for example, a process that is executed by the microcomputer 21 at a predetermined interval.

In step S210, the microcomputer 11 in the ECU 1 detects a position of the wiper operation switch. The wiper operation switch is either in a HI position, a MID position, a LOW position, an AUTO position, or an OFF position. The detected position of the switch is also transferred to the ECU 2.

In step S220, the process determines whether it received a wiping interval, a wiper operation speed. The process proceeds to step S230 when it has not received the interval and the speed (step S220: NO). The process proceeds to step S225 for retrieving the received interval and the speed when the interval and the speed is already received (step S220: YES). The process proceeds to step S230 after the interval and speed are retrieved. In this case, the ECU 2 sends the wiping interval and the wiping speed to the ECU 1 when the wiper operation switch is in the AUTO position by the process shown in FIG. 4B.

In step S230, the wiping interval and the wiping speed are controlled according to the position of the wiper operation switch. That is, the wiping interval is set to infinite when the wiper operation switch is in the OFF position. The wiping speed is set accordingly when the switch is either in the HI, MID, or LOW position. The interval of the operation is set to zero for a continuous operation. The wiping interval and speed are set by using the interval/speed retrieved in step S225 when the switch is in AUTO position.

In step S235, the operation timing set in step S230 is detected. That is, an elapsed time from the last operation is compared with the wiping interval set in step S230. When the timing is right for the operation of the wiper (step S235: YES), the process proceeds to step S240 and the wiper is operated at a speed set in step S230. The process concludes after wiper operation.

When the elapsed time from the last operation has not reached the interval set by the switch (step S235: NO), the process concludes without operating the wiper.

FIG. 4B shows a flowchart for the process executed in the microcomputer 21 of the additional function ECU 2.

In step S250, the process determines whether the position of the wiper switch is in the AUTO position based on the information received from the ECU 1. The process concludes when the switch is not in the AUTO position (step S250: NO). The process proceeds to step S255 for detecting the amount of the rain by the sensor 3 when the wiper operation switch is in the AUTO position (step S250: YES).

In step S260, the process calculates the wiping interval and the wiping speed based on the detected amount of the rain and the speed of the vehicle. The speed of the vehicle is received from other ECU connected to the wiring 5. The wiping interval set in this decreases in proportion to the amount of the rain and the speed of the vehicle. The wiping speed is also determined in accordance with the amount and the speed, that is, the speed increases when the amount of the rain and the speed of the vehicle increase.

In step S265, the wiping interval and speed calculated in step S260 are sent to the ECU 1 before the process concludes itself. The interval and the speed sent to the ECU 1 are used in step S230 of the flowchart in FIG. 4A.

Therefore, the wiper is operated by the ECU 1 at the interval and the speed set by the wiper operation switch when the position of the wiper switch is either in the Hi, MID, or LOW position. The wiper is operated according to a suitable wiping interval and speed calculated by the ECU 2 when the position of the wiper operation switch is in the AUTO mode.

The vehicle control system in the second embodiment does not have to change the design of the standard function ECU 1 when specification of operation corresponding to the AUTO position of the operation switch is changed. That is, for example, change in the specification of rain detection logic, wiper speed calculation logic, rain detection sensor type or the like may be accommodated by re-designing of the ECU 2. Therefore, the development period of the vehicle control system can be decreased for the improved productivity and cost performance.

Further, the AUTO position of the wiper operation function can be easily omitted when it is specified as an optional function in the vehicle control system. That is, the wiper control function without having the AUTO position can be prepared only by omitting the additional function ECU 2. In this manner, the wiper operation function having an optional function can be easily implemented by using the ECUs.

Although the present invention has been fully described in connection with the preferred embodiment thereof with reference to the accompanying drawings, it is to be noted that various changes and modifications will become apparent to those skilled in the art.

For example, a high/low beam control function for a headlight in cooperation with a horizontal swivel function may be implemented as a combination of the primary and secondary ECUs. In this case, a basic headlight function such as ON/OFF operation of the headlight, manual high/low beam switching and the like is controlled by using the function implemented in the primary ECU (ECU 1), while an automatic high/low beam control and an automatic swivel control of the headlight is managed by using the function implemented in the secondary ECU (ECU 2) beside detecting an on-coming vehicle. Therefore, the changes in specification of the headlight control function such as a on-coming vehicle detection logic for high-low beam control, a curve detection logic for a swivel control, and/or a sensor model are accommodated only by the re-designing of the ECU 2. In this manner, the development of the vehicle control system for the headlight control is facilitated for increased effectiveness and functionality.

For yet another example, a climate control function for a vehicle in cooperation with an occupant detection function may be implemented as a combination of the primary and secondary ECUs. In this case, a basic climate control function such as a temperature control function according to an inputted temperature is controlled by using the function implemented in the primary ECU (ECU 1), while an automatic air-flow control function for optimizing conditioned air-flow based on a detection result of the number of occupants, the positions of the occupants in the vehicle, the direction of their faces and the like is controlled by using the function implemented in the secondary ECU (ECU 2). Therefore, the changes in specification of the automatic air-flow control function such as an air-flow control logic in the air-flow control function and/or the sensor used for detecting the occupant are accommodated only by the re-designing of the ECU 2. In this manner, the development of the vehicle control system for the climate control function is facilitated for increased effectiveness and functionality.

Further, a vehicle control system for controlling a car audio system may be implemented in the same manner by using two ECUs as the air-flow control function. That is, a sound field control function of the car audio system for accommodating a different number/position of the occupants may be implemented as the function of the secondary ECU (ECU 2) in terms of readiness for the change in specification of sound field adjustment logic or the like. By only replacing the secondary ECU (ECU 2), the modified portion of the specification of the vehicle control system can be implemented.

For still yet another example of the vehicle control system, a combination of the primary and secondary ECUs may be used to implement a seat-belt control function in cooperation with an expected collision detection function. In this case, the expected collision detection function may be implemented as the secondary ECU, and the seat-belt control function for fastening the seat-belt with collision detection may be implemented as the primary ECU. The change in specification in the expected collision detection logic and/or the sensor for detecting the expected collision can be implemented only by re-designing the secondary ECU. The expected collision detection function as an option for the seat-belt control function with collision detection can readily be added to or deleted from the vehicle control system by simply adding or omitting the secondary ECU (ECU 2).

For still yet another example of the vehicle control system, a combination of the primary and secondary ECUs may be used to implement a valve timing control function as part of a total engine control function. In this case, actuators for operating the valves may controlled by the secondary ECU while the rest of the total engine control is administered by the primary ECU. In this manner, change in specification of the valve timing control logic and/or the actuator can be selectively managed only by re-designing of the secondary ECU. Further, the valve timing control function can be designed and handled separately from the total engine control, and thus the valve timing control function can be used as an option in the total engine control function of the vehicle control system.

For still yet another example of the vehicle control system, a combination of the primary and secondary ECUs may be used to implement a head-up display function besides an instrument panel function. The head-up display function that displays vehicle information on an inner surface of a windshield may be handled and accommodated solely by the secondary ECU (ECU 2). Therefore, the change in specification of the content of vehicle information can be managed only by re-designing the secondary ECU (ECU 2). Further, the head-up display function can be designed and handled separately from the instrument panel function, and thus the head-up display function can be used as an option in the instrument panel function.

For still yet another example of the vehicle control system, a combination of the primary and secondary ECUs may be used to implement a vehicle information system by using an FM frequency in cooperation with a short range communication system. In this case, the vehicle information system is governed by the primary ECU (ECU 1) and the short range communication system is managed by the secondary ECU (ECU 2). Therefore, the change in specification of the short range communication system can be accommodated only by redesigning of the secondary ECU (ECU 2).

Merely for the sake of thoroughness, the primary ECU and the secondary ECU in the above-described embodiments may be used to implement other kind of functions. Further, the secondary ECU that bears a modification-prone function may be divided for accommodating more detailed/specific functions to facilitate the development of the vehicle control system.

Such changes and modifications are to be understood as being within the scope of the present invention as defined by the appended claims.

What is claimed is:

1. A vehicular control system controlling a vehicle device, the vehicular control system comprising:
    a first electric control unit controlling a first function of the vehicle device that is normally required to control the vehicle device; and
    a second electric control unit controlling a second function of the vehicle device different than the first function and associated with the first function of the vehicle device, wherein
    the first electric control unit and the second electric control unit are in communication and are separately disposed in a vehicle,
    at least the second electric control unit is removable from the vehicular control system such that controlling the first function of the vehicle device is unaffected by removal of the second electric control unit,
    the first electric control unit directs control of the first function according to (a) an internal condition of the first electric control unit based on control of the first function of the first electric control unit and (b) an internal condition of the second electric control unit based on the control of the second function by the second electric control unit, and
    the first electric control unit receives and uses the internal condition of the second electric control unit to direct control of the first function.

2. The vehicular control system of claim 1, wherein
    the first function controlled by the first electronic control unit provides a primary control of the vehicle device,
    the second function controlled by the second electronic control unit provides a secondary control of the vehicle device, wherein
    the primary control has fewer changes than the secondary control during a development period of the vehicular control system, and the first electric control unit and the second electric control unit together facilitate development of the vehicular control system.

3. The vehicular control system of claim 1, wherein the second electronic control unit is coupled to the first electric control unit and to other devices through an in-vehicle LAN.

4. The vehicular control system of claim 1, wherein the first electric control unit is the only control unit that communicates directly with the vehicle device, the second electric control unit sends signals indicating the internal condition of the second electric control unit to the first control unit to enable the first control unit to control the first function of the vehicle device according to the internal condition of the second electric control unit.

5. The vehicular control system of claim 1, wherein
    the first function controlled by the first electronic control unit provides a primary control of the vehicle device,
    the second function controlled by the second electronic control unit provides a secondary control of the vehicle device,
    the internal condition of the first electronic control unit includes an operational state of the primary control, and
    the internal condition of the second electric control unit includes an operational state of the secondary control.

6. A vehicular control system controlling a vehicle device, the vehicular control system comprising:
    a first electric control unit controlling a first function that is normally required to control the vehicle device; and
    a second electric control unit controlling a second function of the vehicle device different than the first function and associated with the first function of the vehicle device, wherein
    the first electric control unit and the second electric control unit are in communication and are separately disposed in a vehicle,
    at least the second electric control unit is removable from the vehicular control system such that controlling the first function of the vehicle device is unaffected by removal of the second electric control unit,
    the second electric control unit directs control of the second function according to (a) an internal condition of the first electric control unit based on the control of the first function by the first electric control unit and (b) an internal condition of the second electric control unit based on the control of the second function by the second electric control unit, and
    the second electric control unit receives and uses the internal condition of the first electric control unit to direct control of the second function.

7. The vehicular control system of claim 6, wherein the first electric control unit sends signals indicating the internal condition of the first electric control unit to the second electric control unit to enable the second control unit to direct control of the second function according to the internal condition of the first electric control unit.

8. The vehicular control system of claim 6, wherein
    the first function controlled by the first electronic control unit provides a primary control of the vehicle device,
    the second function controlled by the second electronic control unit provides a secondary control of the vehicle device,
    the internal condition of the first electronic control unit includes an operational state of the primary control, and
    the internal condition of the second electric control unit includes an operational state of the secondary control.

9. A vehicular control system controlling a vehicle device, the vehicular control system comprising:
    a first electric control unit controlling a first function that is normally required to control the device; and
    a second electric control unit controlling a second function of the vehicle device different than the first function and associated with the first function of the vehicle device, wherein
    the first electric control unit and the second electric control unit are in communication and are separately disposed in a vehicle,
    at least the second electric control unit is removable from the vehicular control system such that controlling the first function of the vehicle device is unaffected by removal of the second electric control unit, the second electric control unit directs control of the second function according to an internal condition of the first electric control unit based on the control of the first function by the first electric control unit, and the second electric control unit receives and uses the internal condition of the first electric control unit to direct control of the second function.

10. The vehicular control system according to claim 9, wherein
the second electric control unit is integrally composed of at least one of a sensory device and an actuator for the second function.

11. The vehicular control system of claim 9, wherein the second electric control unit is divided into at least two control units to accommodate portions of the second function.

12. The vehicular control system according to claim 9, wherein:
the first controller stabilizes a speed of a subject vehicle; and
the second controller stabilizes an inter-vehicle distance based on a distance to a preceding vehicle.

13. The vehicular control system according claim 12, wherein the second controller is integrally composed of at least one of a sensor and an actuator.

14. The vehicular control system according to claim 9, wherein:
the first controller controls the vehicle device based on an input from at least one switch; and
the second controller controls the vehicle device based on detection of a certain condition.

15. The vehicular control system according to claim 14, wherein the second controller is integrally composed of at least one of a sensor and an actuator.

16. The vehicular control system according to claim 9, wherein:
the first controller controls a wiper on a window of the vehicle based on an input from at least one switch; and
the second controller controls a wiping interval of the wiper based on detection of a condition of rain.

17. The vehicular control system according to claim 16, wherein the second controller is integrally composed of at least one of a sensor and an actuator.

18. The vehicular control system according to claim 9, wherein:
the first controller operates a headlight of the vehicle based on an input from at least one switch; and
the second controller controls a direction of a light beam of the headlight based on detection of an on-coming vehicle.

19. The vehicular control system according to claim 18, wherein the second controller is integrally composed of at least one of a sensor and an actuator.

20. The vehicular control system according to claim 9, wherein:
the first controller operates a headlight of the vehicle based on an input from at least one switch; and
the second controller controls a direction of a light beam of the headlight based on detection of a curvature of a road where the vehicle is traveling.

21. The vehicular control system according to claim 20, wherein the second controller is integrally composed of at least one of a sensor and an actuator.

22. The vehicular control system according to claim 9, wherein:
the first controller controls a cabin climate of the vehicle based on an input from at least one switch; and the second controller controls the cabin climate based on detection of at least a number of occupants in the subject vehicle and positions of the occupants.

23. The vehicular control system according to claim 22, wherein the second controller is integrally composed of at least one of a sensor and an actuator.

24. The vehicular control system according to claim 9, wherein:
the first controller operates an audio device of the vehicle based on an input from at least one switch; and
the second controller controls the audio device based on detection of at least a number of occupants in the vehicle and positions of the occupants.

25. The vehicular control system according to claim 24, wherein the second controller is integrally composed of at least one of a sensor and an actuator.

26. The vehicular control system according to claim 9, wherein:
the first controller controls fastening down of a seat belt of a subject vehicle based on an input of a collision signal; and
the second controller controls fastening down of the seat belt based on detection of a probable collision of the vehicle.

27. The vehicular control system according to claim 26, wherein the second controller is integrally composed of at least one of a sensor and an actuator.

28. The vehicular control system according to claim 9, wherein:
the first controller operates an engine except for variably operating at least one of intake and exhaust valves of the engine of the vehicle based on a running condition of the engine; and
the second controller operates at least one of intake and exhaust valves of the vehicle based on the running condition of an engine.

29. The vehicular control system according to claim 28, wherein the second controller is integrally composed of at least one of a sensor and an actuator.

30. The vehicular control system according to claim 9, wherein:
the first controller displays information on an instrument panel of the vehicle; and
the second controller displays information on a window of the vehicle.

31. The vehicular control system according to claim 30, wherein the second controller is integrally composed of at least one of a sensor and an actuator.

32. The vehicular control system according to claim 9, wherein:
the first controller provides information for at least one occupant of the vehicle based on communication with a long-range transmission radio signal; and
the second controller provides information for at least one occupant of the vehicle based on communication through a short-range transmission of radio signal.

33. The vehicular control system according to claim 30, wherein the second controller is integrally composed of at least one of a sensor and an actuator.

34. The vehicular control system according to claim 9, wherein:
the second function is not required to control the vehicle device and can be selectively set to control the vehicle device.

35. The vehicular control system of claim 34,
wherein the second electric control unit is integrally composed of a sensory device or an actuator for the second function.

36. The vehicular control system of claim 9, wherein the first electric control unit sends signals indicating the internal condition of the first electric control unit to the second electric control unit to enable the second control unit to direct control of the second function according to the internal condition of the first electric control unit.

37. The vehicular control system of claim 9, wherein
the first function controlled by the first electronic control unit provides a primary control of the vehicle device,
the second function controlled by the second electronic control unit provides a secondary control of the vehicle device, and
the internal condition of the first electronic control unit includes an operational state of the primary control.

* * * * *